UNITED STATES PATENT OFFICE.

LOUIS GEVAERT-NAERT, OF BEVERE-AUDENARDE, BELGIUM, ASSIGNOR TO SOCIÉTÉ ANONYME DES CUIRS ET COURROIES D'AUDENARDE, OF AUDENARDE, BELGIUM.

PROCESS OF MANUFACTURING ARTIFICIAL LEATHER.

No. 873,582.   Specification of Letters Patent.   Patented Dec. 10, 1907.

Application filed January 31, 1907. Serial No. 355,086.

*To all whom it may concern:*

Be it known that I, LOUIS GEVAERT-NAERT, a subject of the King of Belgium, and a resident of Bevere-Audenarde, Belgium, have invented a certain new and useful Process of Manufacturing Artificial Leather and Similar Products, of which the following is a specification.

This invention relates to processes of manufacturing artificial leather and similar products, and has for its especial object the provision of a process of this character wherein artificial leather may be produced by impregnating teazeled or felted tissues, preferably cotton tissues, with solutions of tanned gelatin, or other tanned albuminoid or proteid substances, either separate or in combination. In the practice of my improved process this impregnation may be carried out *in vacuo* when thick materials are to be produced or without using a vacuum when lighter articles are to be obtained.

In use the tanned material is dissolved in ammoniacal water or in any other suitable solvent.

Example: Gelatin, casein or other suitable albuminoid substance is dissolved in water or in slightly alkaline water, and to this is added, either with or without heating, a solution of tannic acid, extract of sumac or other tanning substance. In this way a sediment or precipitate of tanned material is obtained which is repeatedly washed with cold water. The tanned material is then dissolved in ammoniacal water or in some other suitable solvent and with this solution the teazeled tissue is impregnated, after which the tissue is dried. This operation is repeated until the interior of the tissue has acquired a homogeneous texture, similar to that of natural leather. The tanned albuminoid substance is precipitated in an insoluble state inside the tissue by evaporation of the solvent, and there is thus produced artificial leather of any thickness which is adapted to be employed for boots, straps, bags and the like.

The appearance, suppleness and the other properties of these artificial leathers may be modified by adding to the solutions of tanned albuminoid substances other substances such as coloring matters, solutions of gum lac or other gums, glycerin, fatty materials and so on, or by treating them beforehand or afterwards with solutions of gutta, or rubber, or of cellulose.

In preparing the solution of tanned albuminoid materials it is also possible to first tan the undissolved albuminoid material or to mix the tanning substance with the albuminoid material in presence of concentrated ammonia in order to prevent precipitation; however, these processes prevent the elimination of the impurities and are accordingly less advantageous. It is furthermore possible to substitute for the felted or teazeled tissues, felt which is not woven or tissues which are not teazeled. Thus less perfect products are obtained. These modifications of my process are by no means recommended, and are referred to only by way of example with a view of showing that they form a part of my invention.

It is to be understood that proteid and other materials adapted to be tanned are the equivalents of the albuminoid materials hereinbefore referred to in the practice of my process.

Having now fully described my said invention, what I claim and desire to secure by Letters Patent is:

1. A process of manufacturing artificial leather and similar products comprising impregnating tissues with a solution of tanned albuminoid materials and drying said tissues, substantially as, and for the purpose set forth.

2. A process of manufacturing artificial leather and similar products comprising impregnating teazeled or felted tissues with a solution of tanned albuminoid materials and drying said tissues, substantially as, and for the purpose set forth.

3. A process of manufacturing artificial leather and similar products comprising impregnating *in vacuo* tissues with a solution of tanned albuminoid substances and drying said tissues, substantially as and for the purpose set forth.

4. A process of manufacturing artificial leather and similar products comprising impregnating *in vacuo* teazeled or felted tissues with a solution of tanned albuminoid substances and drying said tissues, substantially as, and for the purpose set forth.

5. A process of manufacturing leather and similar products which consists in dissolving an albuminoid substance in a suitable solvent, adding a tanning agent thereto, dissolving the tanned albuminoid in a suitable solvent, impregnating teazeled or felted tissues therewith and evaporating the solvent of the tanned albuminoid, substantially as described.

6. A process of manufacturing artificial leather and similar products which consists in dissolving an albuminoid substance in a suitable solvent, treating the solution thus produced with a tanning agent, washing the tanned albuminoid with cold water, dissolving the tanned material in a suitable solvent, impregnating teazeled or felted tissues with said solution, and finally drying the said tissues, substantially as described.

7. In the herein described process, the steps of dissolving an albuminoid substance, adding a tanning agent to the solution thereof, and redissolving the said albuminoid substance, substantially as, and for the purpose specified.

In testimony whereof I have hereunto set my hand in presence of two witnesses.

LOUIS GEVAERT-NAERT.

Witnesses:
GREGORY PHELAN,
C. VANHELSEN.